United States Patent [19]
Yamada

[11] Patent Number: 5,471,667
[45] Date of Patent: Nov. 28, 1995

[54] WATERPROOF TYPE UNIT CASING

[75] Inventor: Hiroyasu Yamada, Tokyo, Japan

[73] Assignee: NEC Corporation, Japan

[21] Appl. No.: 217,379

[22] Filed: Mar. 24, 1994

[30] Foreign Application Priority Data

Mar. 29, 1993 [JP] Japan .................... 5-070250

[51] Int. Cl.$^6$ .............................. H04B 1/08; H01M 2/10
[52] U.S. Cl. ........................ 455/351; 455/90; 429/100
[58] Field of Search ................................ 455/347, 348, 455/349, 351; 429/96, 97, 100; 455/346, 90; 361/683, 814

[56] References Cited

U.S. PATENT DOCUMENTS

| | | | |
|---|---|---|---|
| 4,225,655 | 9/1980 | Pesce | 429/100 |
| 4,276,632 | 6/1981 | Hiraishi | 368/203 |
| 4,363,169 | 12/1982 | Nasu et al. | 30/41 |

FOREIGN PATENT DOCUMENTS

| | | |
|---|---|---|
| 367608 | 5/1990 | European Pat. Off. . |
| 2253238 | 9/1992 | United Kingdom . |
| 2256081 | 11/1992 | United Kingdom . |
| 9010955 | 9/1990 | WIPO . |

Primary Examiner—Reinhard J. Eisenzopf
Assistant Examiner—Thanh Le
Attorney, Agent, or Firm—Ostrolenk, Faber, Gerb & Soffen

[57] ABSTRACT

A casing for a waterproof type includes a cover 1, a battery cover 2, an elastic packing 3, and an inner cover 4. The cover 1 has a battery accommodation section 10. The battery cover 2 closes an opening 11 of the battery accommodation section 10. The elastic packing 3 is disposed along the opening 11. The inner cover 4 closes the opening 11 in close contact with the packing 3. The battery cover 2 is locked to the cover 1 in a state with the inner cover 4 urged against the opening 11 by sliding the battery cover 2 in a direction different from the direction of urging the packing 3 against the opening 11.

9 Claims, 4 Drawing Sheets ly in the rails 13. The battery cover 2 can be
engaged with the cover 1 by inserting its engagement
portions 20 of its battery cover 2 into the rails 13.

WATERPROOF TYPE UNIT CASING

The present invention relates to a casing of a waterproof type unit capable of preventing intrusion of water or the like with an elastic packing and, more particularly, to a waterproof casing structure suited for a radio communication unit and a waterproof type receiver for individual calling.

Among the radio communication units, there are those of waterproof type having a packing of rubber or the like for preventing intrusion of water or the like into the inside of the ,casing. FIG. 7 is a perspective view showing a conventional waterproof type radio communication casing, and FIG. 8 is a fragmentary enlarged sectional view showing the same casing. The conventional casing comprises a cover 1 having a battery accommodation section 10 and a receiving hollow 15, a battery cover 2 having a recess 25 in which a coin or the like may be inserted and a latch portion. 26 which is to be inserted in the receiving hollow 15, and an elastic packing 3.

In such a conventional waterproof type radio communication casing, as shown in FIG. 8, the latch portion 26 is latched with the receiving hollow 15 to tightly engage the battery cover 2 with the cover 1, thereby compressing the elastic packing 3 to prevent intrusion of water or the like into the battery accommodation section 10. The battery cover 2 is removed or detached from the cover 1 by utilizing the principles of the lever, that is, by inserting a coin or the like auxiliary tool into the recess 25.

With the above conventional waterproof type radio communication casing, for mounting and dismounting (detaching) the battery cover 2 on and out of the cover 1, the latch portion of the battery cover and the periphery of the latch receiving hollow of the cover are deformed to effect the intended operation. This means that it is necessary to exert a somewhat Great force and to use a coin or like auxiliary tool, causing a possibility of destroying the casing.

SUMMARY OF THE PRESENT INVENTION

An object of the present invention, therefore, is to provide a waterproof type casing capable of easy mounting and dismounting of the battery cover on and from the cover without causing intrusion of water or the like into the inside of the casing and damages to the casing.

According to an aspect of the present invention, there is provided a casing for a waterproof type radio communication unit comprising a cover having a battery accommodation section, a battery cover for closing an opening of the battery accommodation section, an elastic packing disposed along the opening, and an inner cover for closing the opening in close contact with the packing, the battery cover being locked to the cover in a state with the inner cover urged against the opening by sliding the battery cover in a direction different from the direction of urging the packing against the opening.

According to another aspect of the present invention, there is provided a casing for a waterproof type comprising, a box-like cover having a battery accommodation section at its corner portion which includes an opening for inserting and removing a battery, an elastic packing disposed along opening edges of the opening, and first rails formed near the opening and elongating in a direction perpendicular to the direction of urging the packing against the opening edges of the opening; a battery cover, for closing the opening of the battery accommodation section at its corner portion, which includes engagement portions formed along its edges for being slidably inserted in the first rails and second rails extending in a direction perpendicular to the direction of urging the packing against the opening edges of the opening; an inner cover, for closing the opening of the battery accommodation section in cooperation with the battery cover, which includes an external surrounding edges of the inner side plane adapted to be in close contact with the packing and engagement pieces for being slidably inserted in the second rails, the inner cover being slidable over the battery cover in the same direction as the direction of sliding of the battery cover with respect to the cover, thereby engaging the battery cover with the cover by inserting its engagement portions of the battery cover into the first rails.

Other objects and features will be clarified from the following description with reference to attached drawings.

DETAILED DESCRIPTION OF THE PREFERRED EMBODIMENTS

Figure 1:
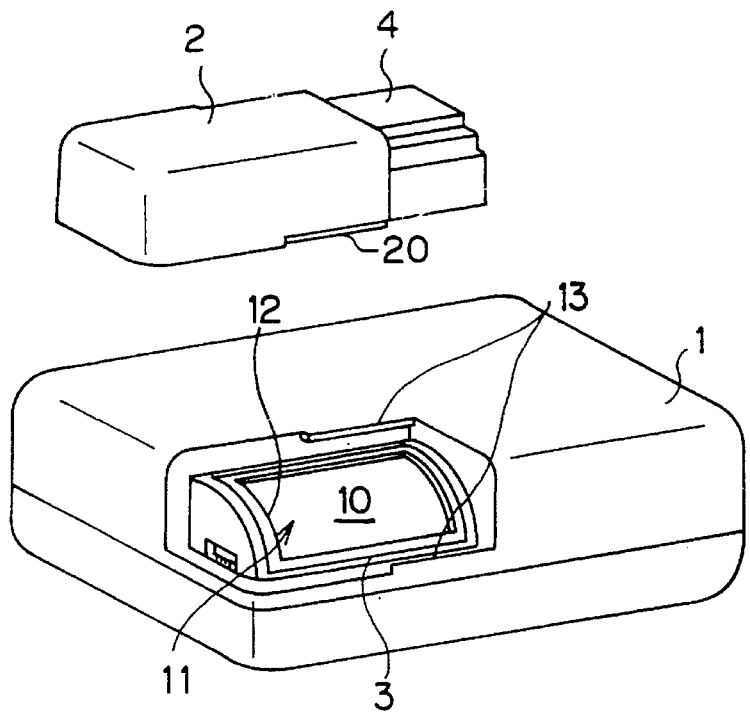
FIG. 1 is an exploded perspective view showing an embodiment of the casing for a waterproof type receiver for individual calling according to the present invention.

An embodiment of the casing of a waterproof type receiver for individual calling according to the present invention will now be described with reference to the drawings.

Referring now to FIGS. 1 to 6, the illustrated casing for a waterproof type receiver for individual calling comprises a cover 1, a battery cover 2, a packing 3 and an inner cover 4. The cover 1 is box-like and has a battery accommodation section 10 at its corner portion. The battery accommodation section 10 has an opening 11 for inserting and removing a battery (not shown). The battery cover 2 closes the opening 11 of the battery accommodation section 10 in cooperation with the inner cover 4. The packing 3 is elastic and disposed along the opening edges 12 of the opening 11, which is made of rubber having a circular sectional profile. The inner cover 4 has external surrounding edges of the inner side plane adapted to be in close contact with the packing 3.

In the cover 1, rails 13, along which the battery cover 2 is slid, are formed near the opening 11. These rails 13 extend in a direction perpendicular to the direction of urging the packing 3 against the opening edges 12 of the opening 11. On one side of both side edges of the battery cover 2, the engagement portions 20 are formed along its edges for being slidably inserted in the rails 13. The battery cover 2 can be engaged with the cover 1 by inserting its engagement portions 20 of its battery cover 2 into the rails 13.

Figure 5:
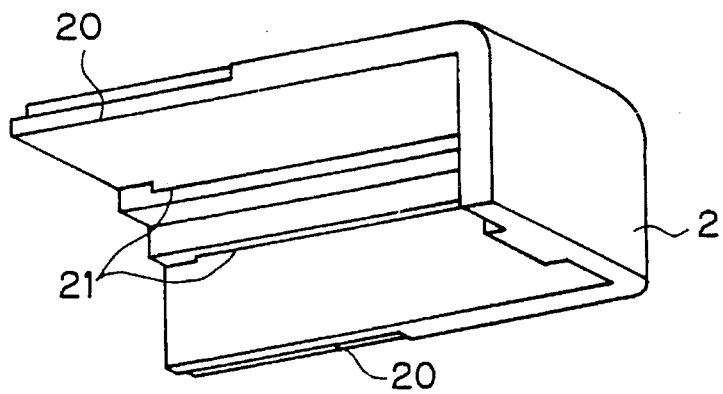
FIG. 5 is a fragmentary exploded perspective view showing the casing shown in FIG. 1.
Figure 5:
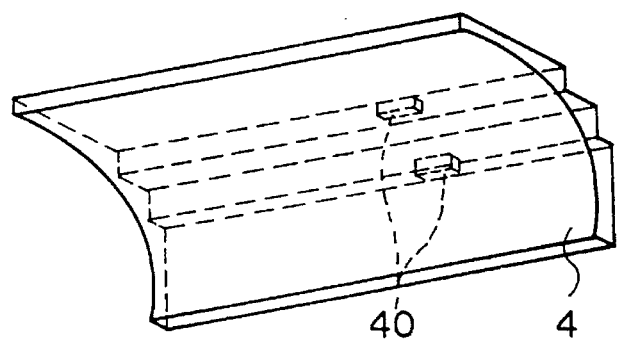
Figure 6:
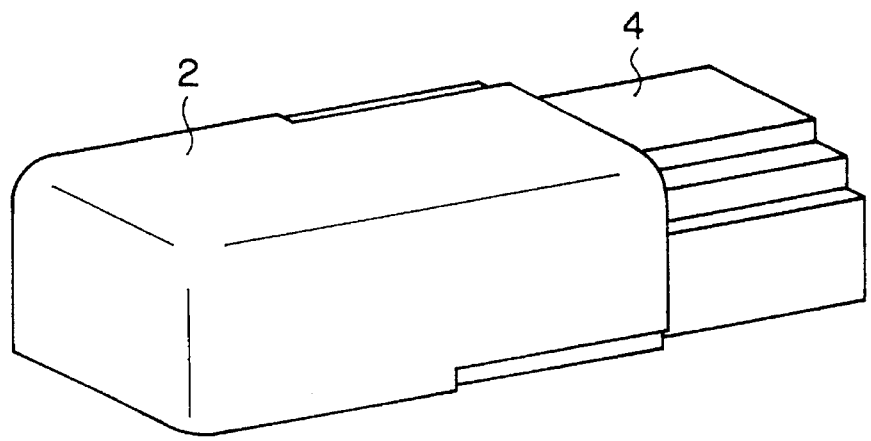
FIG. 6 is a perspective view showing the casing shown in FIG. 1.
Figure 7:
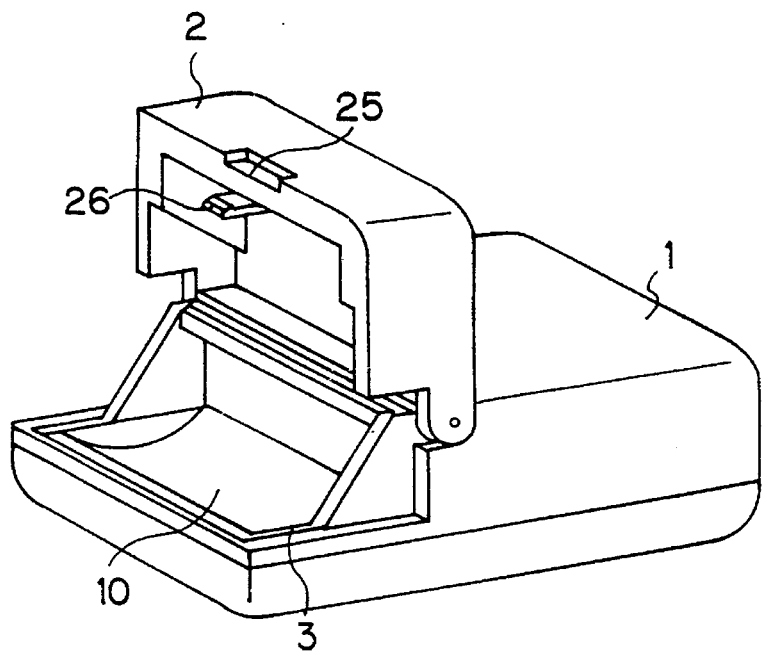
FIG. 7 is a perspective view of a prior art conventional waterproof type radio communication casing.
Figure 8:
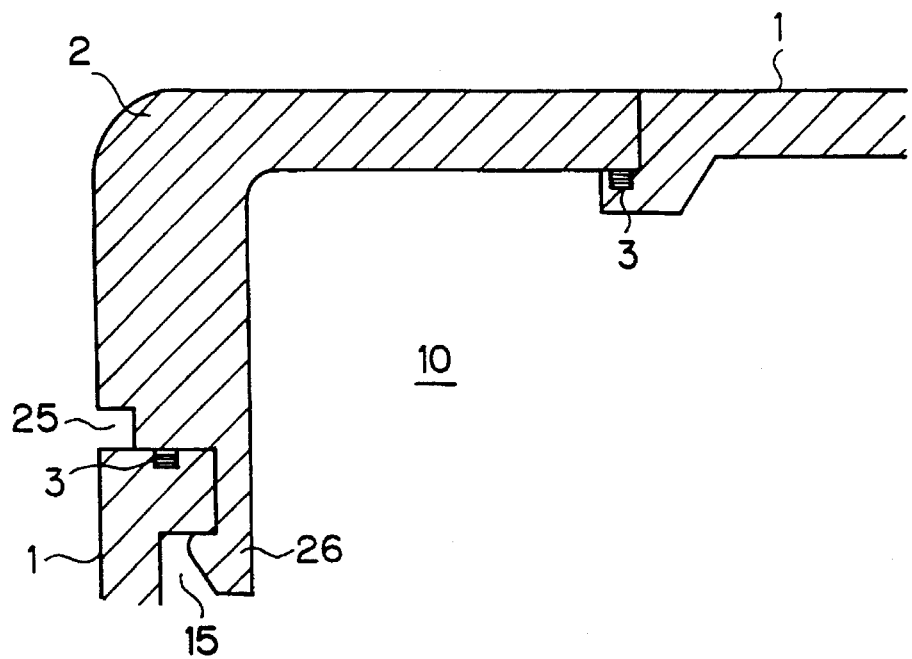
FIG. 8 is a fragmentary enlarged sectional view of the casing of FIG. 7.

As shown in FIG. 5, the battery cover 2 has rails 21 for guiding the inner cover 4. These rails 1 also extend in a direction perpendicular to the direction of urging the packing 3 against the opening edges 12 of the opening 11. The inner cover has engagement pieces 40 for being slidably inserted in the rails 21. As shown in FIG. 6, with the engagement pieces 40 of the inner cover 4 inserted in the rails 21 of the battery cover 2, the inner cover 4 is slidable over the battery cover 2 in the same direction as the direction of sliding of the battery cover 2 with respect to the cover 1.

Figure 2:
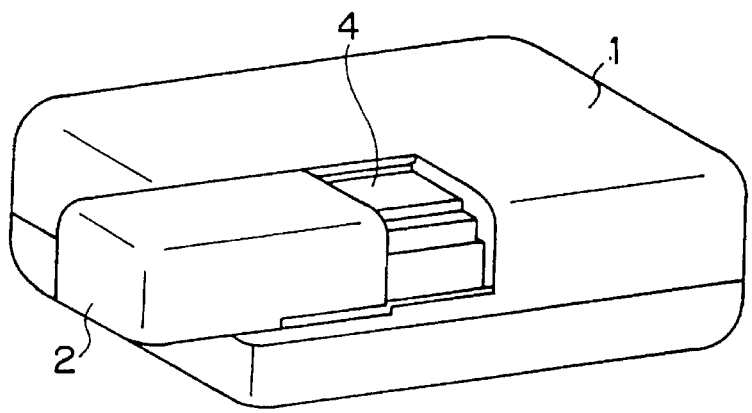
FIG. 2 is a perspective view showing the casing shown in FIG. 1 with a battery cover shown opened.
Figure 3:
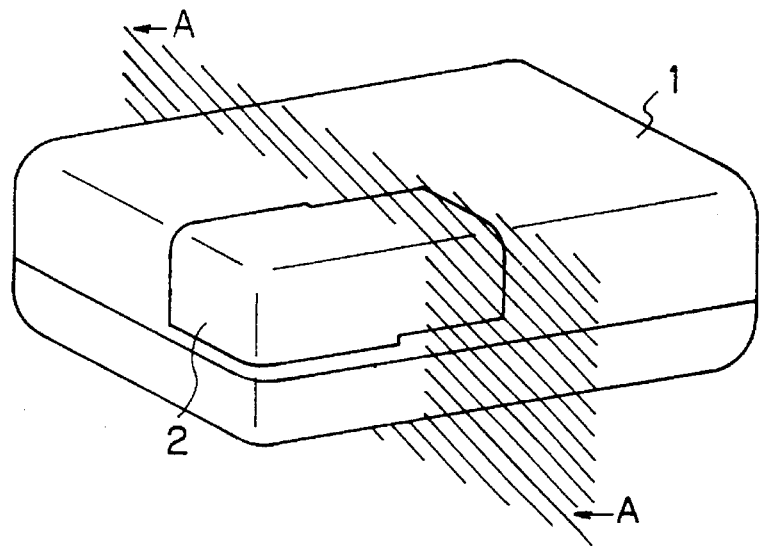
FIG. 3 is a perspective view showing the casing shown in FIG. 1 with the battery cover shown closed.
Figure 4:
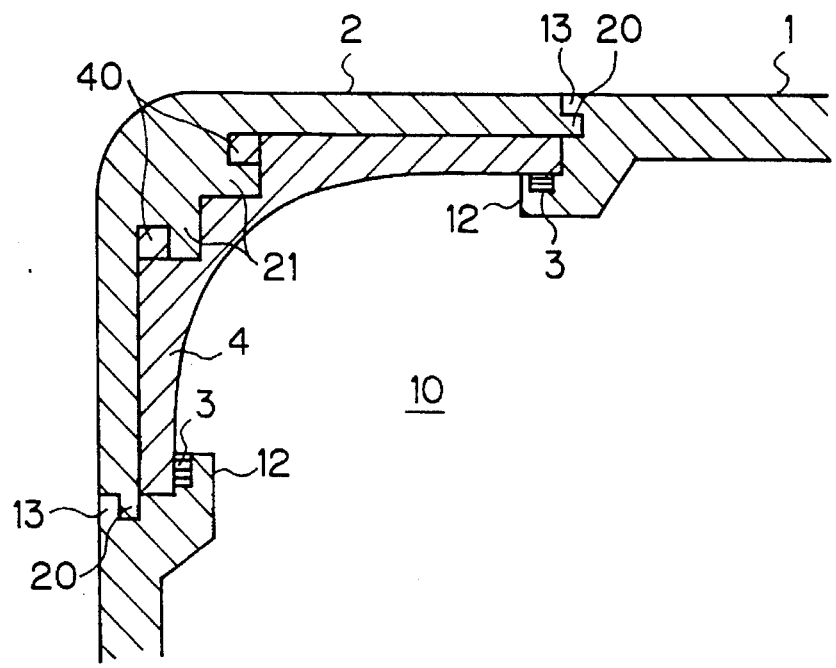
FIG. 4 is a fragmentary enlarged sectional view taken along plane A—A in FIG. 3.

For mounting the battery cover 2 and inner cover 4 on the cover 1, after the inner cover 4 is placed on the opening 11 of the cover 1, as shown in FIG. 2, the inner cover 4 is put on the packing 3. Then, the battery cover 2 is slid to the right in FIG. 2, whereby the engagement portions 20 of the battery cover 2 are inserted in the rails 13 of the cover 1. Thus, as shown in FIG. 3, the battery cover 2 is locked to the opening 11 of the cover 1. Also, the battery cover 2 is held such that the inner cover 4 is urged against the opening 11. In this state, as shown in FIG. 4, the inner cover 4 compresses the packing 3 disposed along the opening edge 12 to effect close contact between the inner cover 4 and packing 3 to waterproof the battery accommodation section 10.

For dismounting the battery cover 2 and inner cover 4 from the cover 1, the battery cover 2 is slid to the left from the state of FIG. 3, thereby taking out the engagement portions 20 of the battery cover 2 from the rails 13 of the cover 1. As a result, the battery cover 2 and inner cover 4 are ready to be removed from the cover 1 as shown in FIG. 2.

As has been described in the foregoing, with the casing of the waterproof type receiver for individual calling according to the present invention, unlike the prior art, the battery cover can be mounted on and dismounted out of the cover without causing deformation of the cover and the battery cover but by merely sliding the battery cover. There is thus no need of exerting a great force when mounting and dismounting the battery cover. Besides, no auxiliary tool such as a coin is required, and there is no possibility of causing damage to the battery cover with the auxiliary tool.

What is claimed is:

1. A casing for a waterproof type radio communication unit comprising a first cover having a battery accommodation section, said battery accommodation section having an opening, an elastic packing disposed along said opening, a second inner cover removably disposed over said opening for closing said opening in close contact with said packing, and a third battery cover for urging said second inner cover against said opening, said third battery cover being slidable relative to said second inner cover in a direction different from the direction of urging said packing against said opening for locking said third battery cover to said first cover.

2. The casing for a waterproof type radio communication unit according to claim 1, wherein said first cover has rails, said rails extending in a direction different from the direction of urging said packing against said opening and slidably receiving edges of said third battery cover to lock said third battery cover to said first cover.

3. A casing for a waterproof type radio communication unit comprising a first cover having a battery accommodation section, said battery accommodation section having an opening, an elastic packing disposed along said opening, a second inner cover removeably disposed over said opening for closing said opening in close contact with said packing and a third battery cover urging said second inner cover against said opening, said third battery cover being slidable relative to said second inner cover in a direction different from the direction of urging said packing against said opening for locking said third battery cover to said first cover, said second inner cover being mounted in said third battery cover such as to be slidable in the same direction as the direction of sliding of said third battery cover.

4. A casing for a waterproof type receiver for individual calling comprising a first cover having a battery accommodation section, said battery accommodation section having an opening, an elastic packing disposed along said opening, a second inner cover removably disposed over said opening for closing said opening in close contact with said packing, and a third battery cover for urging said second inner cover against said opening, said third battery cover being slidable relative to said second inner cover in a direction different from the direction of urging said packing against said opening for locking said third battery cover to said first cover.

5. The casing for a waterproof type receiver for individual calling according to claim 4, wherein said first cover has rails, said rails extending in a direction different from the direction of urging said packing against said opening and slidably receiving edges of said third battery cover to lock said third battery cover to said first cover.

6. A casing for a waterproof type receiver for individual calling comprising a first cover having a battery accommodation section, said battery accommodation section having an opening, an elastic packing disposed along said opening, a second inner cover removably disposed over said opening for closing said opening in close contact with said packing, and a third battery cover for urging said second inner cover against said opening, said third batter cover being slidable relative to said second inner cover in a direction different from the direction of urging said packing against said opening for locking said third battery cover to said first cover, said second inner cover being mounted in said third battery cover such as to be slidable in the same direction as the direction of movement of said third battery cover.

7. A casing for a waterproof type comprising, a box-like cover having a battery accommodation section at its corner portion which includes an opening for inserting and removing a battery, an elastic packing disposed along opening edges of said opening, and a plurality of first rails formed on said box-like cover near said opening and elongating in a direction perpendicular to the direction of urging said packing against said opening edges of said opening;

a battery cover, for closing said opening of said battery accommodation section at said corner portion, which includes engagement portions formed along its edges which are slidably inserted in said first rails, the battery cover including a plurality of second rails extending in a direction perpendicular to the direction of urging said packing against said opening edges of said opening;

an inner cover, for closing said opening of said battery accommodation section in cooperation with said battery cover, said inner cover including packing and engagement pieces which are slidably inserted in said second rails, said battery cover including an inner side plane with surrounding edges which are adapted to be in close contact with said packing and engagement pieces, said inner cover being slidable over said battery cover in the same direction as the direction of sliding of said battery cover with respect to said box-like cover, thereby engaging said battery cover with said box-like cover by inserting said engagement portions of said battery cover into said first rails.

8. A casing for a waterproof type radio communication unit comprising a first cover having a battery accommodation section, said battery accommodation section having an opening, an elastic packing disposed along said opening, a second inner cover removably disposed over said opening for closing said opening in close contact with said packing, and a third battery cover for urging said second inner cover against said opening, said third battery cover being slidable relative to said second inner cover in a direction different from the direction of urging said packing against said opening for locking said third battery cover to said first cover, said first cover having rails, said rails extending in a direction different from the direction of urging said packing against said opening and slidably receiving edges of said third battery cover to lock said third battery cover to said first cover, said second inner cover being mounted in said third battery cover such as to be slidable in the same direction as the direction of sliding of said third battery cover.

9. A casing for a waterproof type receiver for individual calling comprising a first cover having a battery accommodation section, said battery accommodation section having an opening, an elastic packing disposed along said opening, a second inner cover removably disposed over said opening for closing said opening in close contact with said packing, and a third battery cover for urging said second inner cover against said opening, said third battery cover being slidable relative to said second inner cover in a direction different from the direction of urging said packing against said opening for locking said third battery cover to said first cover, said first cover having rails, said rails extending in a direction different from the direction of urging said packing against said opening and slidably receiving edges of said third battery cover to lock said third battery cover to said first cover, said second inner cover being mounted in said third battery cover such as to be slidable in the same direction as the direction of movement of said third battery cover.

* * * * *